United States Patent [19]

Soree et al.

[11] 3,756,694
[45] Sept. 4, 1973

[54] ELECTRIC FIELD CONTROLLABLE BIREFRINGENCE LIQUID CRYSTAL MEDIA AND OPTICAL DISPLAY DEVICES FOR USE THEREOF

[75] Inventors: Richard A. Soree, Chestnut Hill; Mary Jane Rafuse, Harvard, both of Mass.

[73] Assignee: Sperry Rand Corporation, New York, N.Y.

[22] Filed: Sept. 9, 1971

[21] Appl. No.: 178,982

[52] U.S. Cl. ....... 350/160 LC, 252/408, 23/230 LC
[51] Int. Cl. ............................................. G02f 1/28
[58] Field of Search ............. 350/160 LC; 252/408; 23/230 LC

[56] References Cited
UNITED STATES PATENTS

| | | | |
|---|---|---|---|
| 3,597,044 | 8/1971 | Castelland | 350/160 LC |
| 3,625,591 | 12/1971 | Freiser et al. | 350/160 LC |

FOREIGN PATENTS OR APPLICATIONS

| | | |
|---|---|---|
| 1,167,486 | 10/1969 | Great Britain |
| 1,170,486 | 11/1969 | Great Britain |

OTHER PUBLICATIONS

V. A. Usol 'Tseva et al., Chemical Characteristics, Structure, and Properties of Liquid Crystal, Russian Chemical Review, Vol. 32, No. 9, pp. 495–507, (Sept. 1963).

*Primary Examiner*—George F. Lesmes
*Assistant Examiner*—M. B. Wittenberg
*Attorney*—S. C. Yeaton

[57] ABSTRACT

Thin flat panel display devices utilize optical polarization elements to control the amount and location of light transmitted through liquid crystal media having electric field controllable birefringence properties. Nematic liquid crystal compositions are provided, particularly adapted for use in such display systems, that demonstrate electric field controllable birefringence properties, for example, from above room temperature to about −30° Centigrade. These compositions include binary mixtures of p-toluylidene p-n-butylaniline with p-n-butoxybenzylidene p-n-butylaniline or pentyl p-anisylidene p-aminophenyl carbonate with p-ethoxybenzylidene p-n-butylaniline. Ternary compositions may be formed by adding ionizable materials.

22 Claims, 15 Drawing Figures

PATENTED SEP 4 1973　　　　　　　　　　　3,756,694

INVENTORS
MARY JANE RAFUSE
RICHARD A. SOREF
BY

*HP Ferry*
ATTORNEY

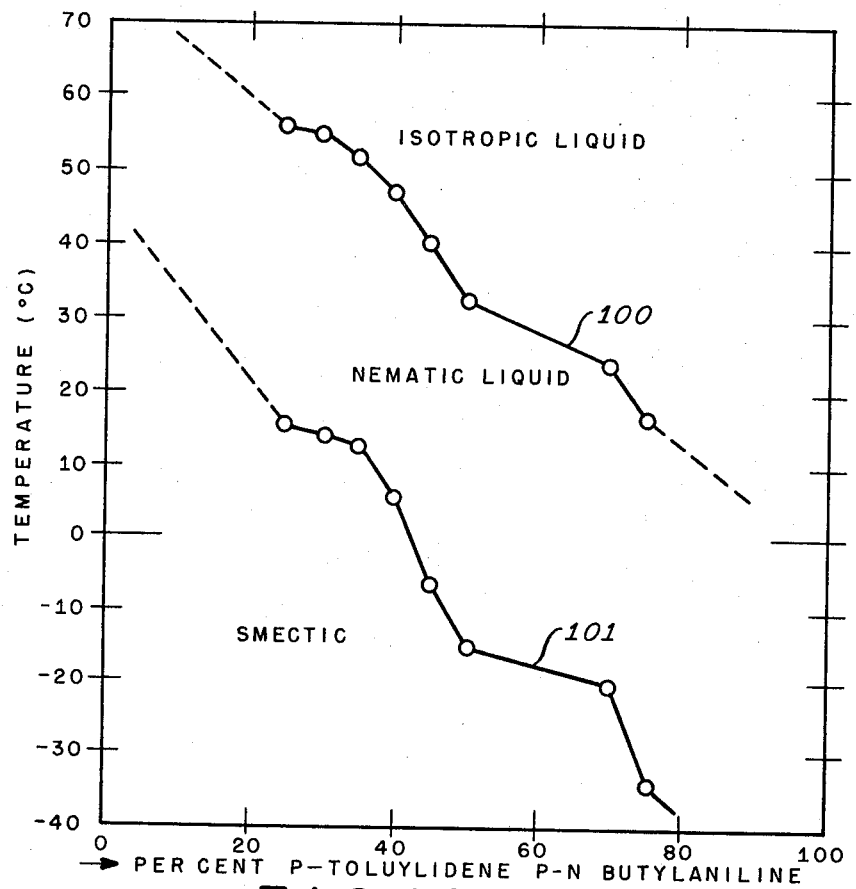
FIG.10.
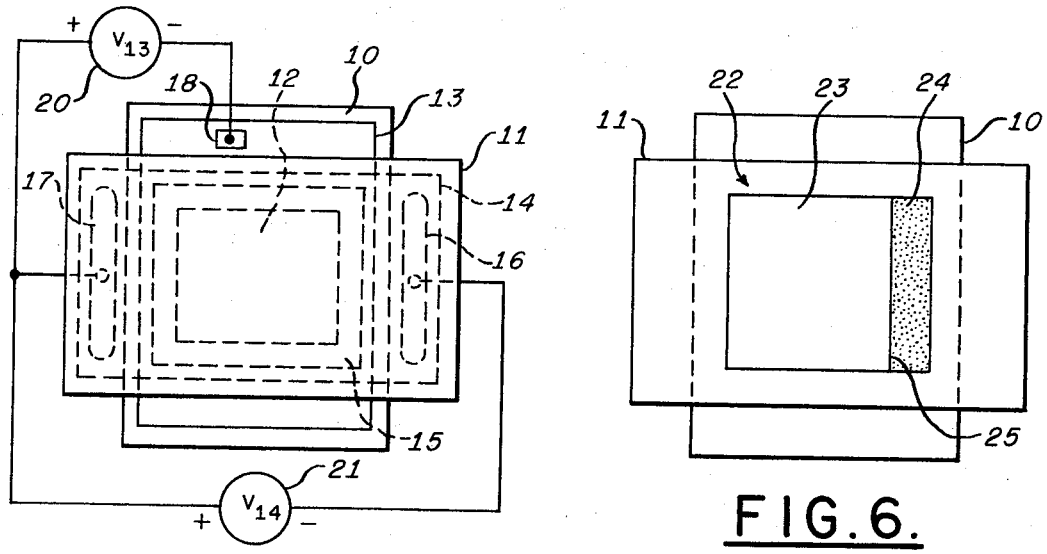
FIG.5.
FIG.6.
INVENTORS
MARY JANE RAFUSE
RICHARD A. SOREF
BY
*H.P. Terry*
ATTORNEY

INVENTORS
MARY JANE RAFUSE
RICHARD A. SOREF
BY

*HP Terry*
ATTORNEY

ELECTRIC FIELD CONTROLLABLE BIREFRINGENCE LIQUID CRYSTAL MEDIA AND OPTICAL DISPLAY DEVICES FOR USE THEREOF

BACKGROUND OF THE INVENTION

1. Field of the Invention

The invention pertains to improved nematic liquid crystal compositions and to novel display apparatus including these compositions and more especially relates to improved nematic materials and compositions of materials useful in novel optical instruments operating in the wide temperature range from as low as $-30°$ Centigrade to above room temperature.

2. DESCRIPTION OF THE PRIOR ART

Certain classes of materials known in the prior art as nematic liquid crystal materials have been found to exhibit electro-optic effects, these compositions being characterized by two transition temperatures. The first is at the transition point between the crystalline solid state and the mesomorphic or liquid crystal state. The second transition temperature is at the transition between the liquid crystal state and the isotropic fluid state.

It is usually desired to operate optical instruments, including electro-optical display devices, at convenient temperatures such as at or near ambient room temperature or at even lower temperatures. Prior art nematic compositions which have solid-to-liquid crystal transitions above room temperature must usually by heated to keep them in the mesomorphic state. Relatively precise temperature regulation is required with such prior art compositions, which often remain in the liquid crystal state only over narrow temperature ranges. Instruments such as optical displays using nematic materials thus often require continuous heating if they are to be ready for instant use.

Nematic liquid crystal materials offer utility, for example, in electrically controlled display devices of the flat panel type. For instance, there are prior art applications of electrically-controllable, dynamic-scattering liquid crystal materials that employ a structure which is a cell of sandwhich configuration comprising a transparent planar front electrode and a specularly reflective back electrode closely spaced with respect thereto. Between the two electrodes is located a thin layer of dynamic light scattering material. With no electric field applied between the two electrodes, the liquid crystal material is optically transparent. Thus, if a viewer sees a black background specularly reflected in the back electrode, the cell looks black to a viewer looking into it through its transparent front. However, when a unidirectional electric field is applied between the electrodes, the liquid abruptly loses its transparent characteristics, scattering any light flowing into it through its transparent front electrode. In this state, the scattered light is returned to the viewer, and the apparent color of the cell is generally the same as the light passing into it through the front electrode. When the electric field is removed, the material abruptly reverts to its transparent state and looks black to the observer.

The scattering effect used in prior art nematic displays in the presence of an electric field has been explained as being caused by localized variations in the effective index of refraction of the medium produced when groups of neutral molecules within the medium are set into motion by the electric field. Apparently, ions set in motion through the normally aligned nematic medium supply the initial shearing disruptive effects. Therefore, some speak of the scattering effect as one produced by the presence of turbulence within the optical medium.

Prior art displays have made advantageous use of the several properties of prior liquid crystal dynamic scattering compositions. In one form, these displays have been digital or discrete in nature; a multiplicity of discrete fixed-area electrode segments has been employed, often in regular arrays. Such displays usually embody planar panels with a plurality of discrete electrode segments formed on the display electrode surface, isolated spatially and electrically from one another. Energization of the display is such that discrete areas of nematic material are either excited or are not excited; i.e., are fully bright in appearance or are dark.

Furthermore, analog displays using dynamic scattering materials are conveniently generated by the apparatus described by R. A. Soref in the United States patent application Ser. No. 879,645 for "Liquid Crystal Electro-Optical Measurement and Display Device", filed Nov. 25, 1969, issued as U.S. Pat. No. 3,675,988 July 11, 1972, and assigned to the Sperry Rand Corporation. Soref provides means for producing a continuously scannable, continuously movable, and continuously alterable bright display image by means of crystalline liquid media controlled to be transparent or optically scattering by simple control circuits operating at relatively low voltage levels. There is provided an electrically controllable flat screen display by placing a dynamic scattering nematic medium between electrode plates, at least one of which is transparent, the electrode plates forming part of a cell enclosing the nematic medium. The transparent electrode is provided with two or more usually different electrical potentials at suitable terminals so that electric field gradients are generated spatially across the display area and also across the thin nematic layer. A plurality of image configurations may thus be generated by the influence of the electric fields upon the nematic medium, the images consisting of translucent areas. A variety of continuously variable images may be generated, including large or small area, time-alterable, transparent analog patterns in a translucent background, or vice versa.

SUMMARY OF THE INVENTION

This invention comprises novel liquid crystal display and other optical apparatus employing electrical field controllable optical birefringence principles and novel electric field controllable birefringence liquid crystal compositions for employment therein. The display apparatus takes the form of a flat cell comprising transparent planar electrodes. Between the two electrodes is placed a thin layer of novel electric field sensitive birefringent liquid crystal material. According to the magnitude of the electric field applied between the two electrodes, polarizer elements associated with the cell permit the flow of light through the cell or prevent such flow. One of the novel electric field controllable birefringence materials is represented by a family of binary mixtures of electro-optically active compounds including various proportions of p-n-butoxybenzylidene p-n-butylaniline and p-toluylidene p-n-butylaniline. Another such composition of materials is represented by a family of binary mixtures of electro-optically active compounds including various proportions of pentyl p-anisylidene p-aminophenyl carbonate and p- ethoxybenzylidene p-n-butylaniline. In both cases, advantageous ternary compositions may be formed by the addition of a small amount of ionizable material, such as a p-n-alkoxyphenol. These novel electro-optically active liquid crystal materials are employed in thin layers in optical cells having transparent electrodes with means for applying electric fields across the layer. The desired display is formed by selection of appropriate patterns of electrical fields to be imposed across the active layer, the electric fields serving to alter the birefringence properties of the liquid crystal layer.

BRIEF DESCRIPTION OF THE DRAWINGS

FIG. 5 is a plan view of part of the apparatus of FIG. 1.

FIG. 6 is a view of a display which may be produced by the apparatus of FIGS. 1 to 5.

FIGS. 10 to 15 are graphs describing the useful properties of the novel compositions.

DESCRIPTION OF THE PREFERRED EMBODIMENTS

The novel electro-optically birefringent nematic liquid crystal compositions described herein may be employed, for example, in the unique electrically controllable, flat panel display devices of FIGS. 1 to 6 for the purpose of generating displays in which the size, shape, and location of the two-dimensional display pattern may be changed continuously, as well as in discrete steps. By means of the apparatus of FIGS. 1 to 6, there may be produced continuously scannable, continuously movable, and continuously alterable, bright display images by means of crystalline liquid media exhibiting electrically controlled birefringence phenomena, which media may be controlled as to degree of birefringence by simple control circuits operating in the novel displays at relatively low voltage and power levels. Such media are distinct from those normally employed in liquid crystal panel displays, in that they have three particular characteristics not employed in media normally used for dynamic scattering or turbulence displays; namely, the electrically controlled birefringent materials herein discussed are characterized:
 a. by being homeotropic in a direction perpendicular to the transparent electrode plates of the cellular panel display when there is no electric field applied to the electrodes,
 b. by having a negative dielectric anisotropy; i.e., $\epsilon_{11} - \epsilon_1 < 0$, where $\epsilon_{11}$ is the dielectric constant parallel to the optical axis of the medium and $\epsilon_1$ is that perpendicular to the optical axis, and
 c. by having the electric field for controlling the display applied parallel to the optical axis of the medium.

A further distinctive feature of the novel electro-optically active media used in the present invention lies in the fact that relatively low voltages and low power suffice to operate the display efficiently, since the electrically controlled birefringence phenomena employed depends for operation mainly upon electrical displacement currents, while media utilizing turbulence or dynamic scattering effects in liquid crystal materials require the steady conduction of electrical current through the medium. Power dissipation of the order of one microwatt per $cm^2$ of the active medium area is readily demonstrated. An additional distinctive feature of the novel media of the present invention lies in having a sharp turn-on threshold. The spontaneous molecular ordering is unchanged for a range of unidirectional or alternating voltages, starting at zero volts. At a critical threshold voltage of about 9 volts r.m.s., for example, the ordered pattern is abruptly distorted, the distortion becoming relatively large within 1 volt r.m.s. above the critical threshold.

Figure 1:
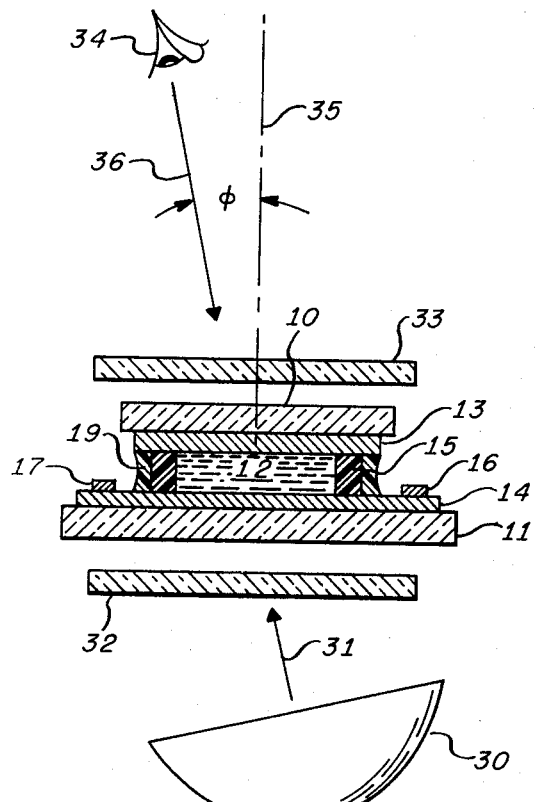
FIG. 1 is a view in cross section of a transmission form of the invention.

In FIGS. 1 and 5, a typical construction for the novel display is shown utilizing a pair of parallel-sided flat glass plates 10 and 11 preferably arranged parallel to each other and separated by a thin layer 12 of the novel electric field sensitive nematic birefringent liquid crystal materials according to the present invention. Plate 10 and plate 11 are coated on their inner surfaces with thin conducting electrodes 13 and 14, respectively. A cell for containing the nematic material is further defined by a continuous quadrilateral dielectric wall 15. Extending lineal or elongate voltage terminals 16 and 17 are applied in conductive relation to electrode 14 on glass plate 11 at the respective opposite ends of that electrode. By virtue of their relatively low resistances, terminals 16 and 17 act as equipotential surfaces. A relatively small electrical terminal 18 (FIG. 5) may be used in conductive relation with electrode 13 on glass plate 10.

Glass plates 10 and 11 may be made of any suitable glass or of other transparent insulating materials compatible with the optical and other requirements of the cell system. For example, the material may be selected to have an optical index of refraction similar to that of the electric field sensitive nematic material 12 so as to avoid undesired reflections at optical interfaces within the cell.

The optically transparent conducting electrodes 13 and 14 may be made of indium oxide, tin oxide, or other similar materials bonded to glass plates 10 and 11 by chemical or evaporative deposition, by sputtering, or by other suitable known methods. The choice of materials is such that conducting electrode 13 has a low resistivity of the order of 50 ohms per square, for example, so that the whole of electrode 13 may readily reach the same potential level as is applied to terminal 18. On the other hand, the material of electrode 14 has a relatively high resistivity of about 100,000 ohms per square, for example. Other resistivity values may be employed, but a relatively high resistivity is beneficial because ohmic loss within the electrodes is then minimized, thereby preventing appreciable temperature rise in the liquid crystal layer 12. Electrodes 13 and 14 may be interchanged, if desired, or two opposed electrodes such as electrode 13 may be used. In other applications, other configurations of electrodes may be used as electrodes 13 and 14, including multiple electrodes.

So that the liquid crystal layer 12 may be contained in its pure form and remain protected from contaminants, and be of uniform thickness, dielectric wall 15 is formed as a continuous wall; it is readily constructed of sheet material available in the market made of a polymerized fluorocarbon material. The tape is available in thicknesses of the order of 0.25 mils, a thickness suitable for use in the present invention. The cell may be held together, at least in part, by a miniscus-shaped film 19 of epoxy or other suitable sealing material applied to the external free surface of wall 15 so that it bonds to that surface and to the adjacent exterior surfaces of electrodes 13 and 14.

The elongated terminals 16 and 17 on plate 11 and the small terminal 18 on plate 10 may be constructed in a conventional manner from an electrically-conducting silver-epoxy material available on the market or be deposition of an area of low conductivity tin or indium oxide by one of the aforementioned processes. As seen in FIG. 5, a voltage source 20 for supplying a voltage V13 is connected between terminals 17 and 18, while a second voltage source 21 is connected between the terminals 16 and 17 common to electrode 14 for supplying a voltage V14 thereacross.

In operation, a source 30 of collimated white or other light may be arranged to illuminate the face of the cell of FIG. 1, as generally indicated by the arrow 31, through a linear optical polarizer 32. The image formed by electric field activation of the electro-optically active medium 12 is viewed from above plate 10 through a second linear polarizer or analyzer 33, as by an observer whose eye is placed at 34 in line with the incident light rays. It will be understood that elements 30, 32, and 33 are suitably fixed in position in FIG. 1 in relation to the cell or panel display by support means not shown, and that the same elements are not shown in FIG. 5, all for the sake of clarity in the drawings of FIGS. 1 and 5. It will be further understood that the vertical scale of the drawings has been exaggerated, also for the sake of clarity.

In operation, the apparatus of FIGS. 1 and 5 makes significant use of the spatial voltage gradient or variation set up across the transparent high resistance electrode means 14. While electrode means 13 may instead be used as the high resistance electrode, or both electrodes may be of high resistance material, only the electrode 14 will be considered to be a high resistivity electrode herein for the sake of simplifying the discussion. With a potential gradient set up across electrode 14, the potential difference between electrodes 13 and 14 (which is the potential drop seen across the birefringent liquid crystal layer 12) varies from one spatial location across layer 12 to a next location. This potential variation gives rise to controllable regions of transparency and opacity within layer 12, providing that the values of V13 and V14 have been appropriately selected. In the usual mode of operation, the polarizers 32 and 33 are crossed. In the regions of layer 12 below threshold, the medium is opaque, while in the regions above threshold, the medium is optically transmissive. The boundary of the transisiton region between the transparent and opaque regions is relatively sharp when employing the novel birefringent liquid crystal materials of the present invention.

Referring to FIG. 6, there is seen a typical display 22 produced according to the present invention within the novel birefringent liquid crystal material. The display comprises a rectangular bright area 23 and a rectangular dark area 24 with a common transition boundary 25. Boundary 25 is readily moved to the left or to the right by relative variation of voltages V13 and V14.

In FIGS. 1, 5, and 6, the rectangular bright area or bar 23 is changed in width by changing the relative magnitudes of voltages V13 and V14 according to a predetermined or other pattern. The value of voltage V13 may be held fixed, while the value of voltage V14 may be changed, or vice versa. For example, consider the result when voltage V14 is set at zero and voltage V13 is increased from zero. This action causes the bright bar or area 23 to increase in width from zero as boundary 25 moves to the right in the drawing, the size of the dark region 24 changing correspondingly. Other arrangements which may be modified according to the teachings of the present invention for producing a variety of similar analog displays are disclosed in the aforementioned United States patent application Ser. No. 879,645, such as arrangements which create two of the bright movable areas such as area 23 of FIG. 6 and which can cause the bright areas to move in cooperative relation so as to expose a movable constant width window or dark area or bar between the two bright areas. Such arrangements may also be used to provide or simulate indicator elements or pointers by providing variable length bars or movable windows to tell a viewer the magnitude of any parameter which may be converted into a voltage and used as one of the voltages V13 or V14. Vertical or horizontal formats are equally possible for the display of temperature, pressure, velocity, acceleration, or other parameters. A suitable scale may be provided next to the bar presentation, for instance, and values of the parameter involved may be read directly off the scale. The scale may itself be generated by constant excitation of nematic cells having electrodes shaped or masked to form numerals. The novel electrically controlled birefringence liquid crystal compositions may also be used in other display devices, including seven-segment numeric displays and matrix displays and other digital displays commonly employing the dynamic scattering effect.

Figure 2:
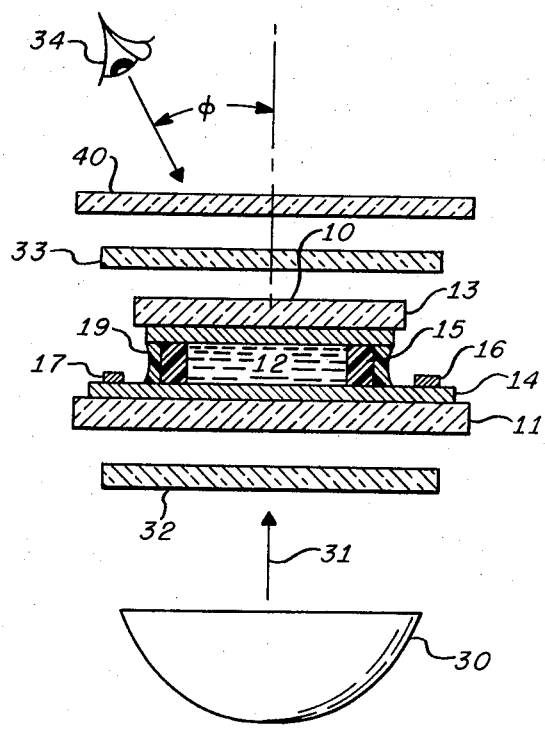
FIG. 2 is a view in cross section of an alternative form of FIG. 1.

In the arrangement of FIG. 1, it will be understood that when a large area light source 30 is used, linear polarizer 32 and linear polarizer or analyzer 33 are normally placed substantially in their crossed positions, extinguishing light in the entire field of view when there is no electric field applied across medium 12. When an electric field is applied across medium 12, the observer at 34 will see a high contrast display at any viewing angle $\phi$ between zero degrees and about 25 degrees off the axis 35 for a typical liquid crystal layer 0.25 mils thick. FIG. 2 is similar to FIG. 1, and similar reference numerals have been applied to corresponding elements. The translucent light diffuser screen 40 added in FIG. 2 between polarization analyzer 33 and the observer 34 adds to the angular extent of the range of good viewing conditions, although the illumination level supplied by light source 30 may need to be increased.

Figure 3:
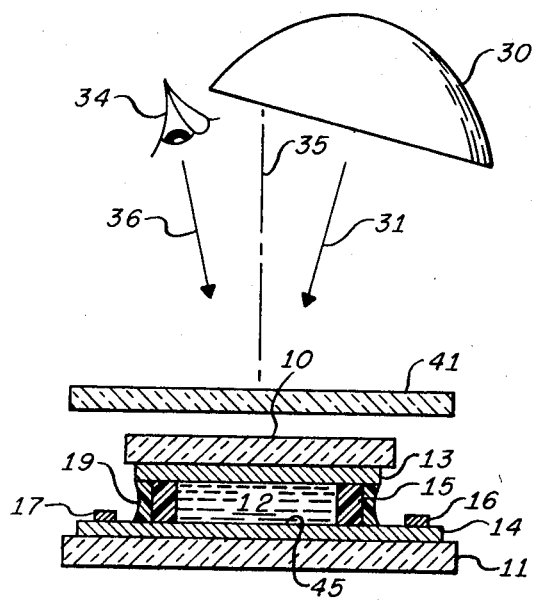
FIG. 3 is a cross section view of a reflecting form of the invention.
Figure 4:
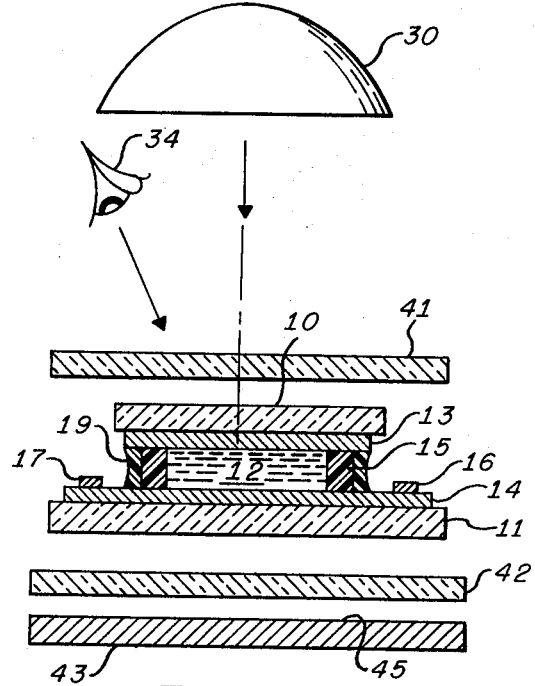
FIG. 4 is a view in cross section of an alternative form of FIG. 3.

The invention may be operated in the transmissive mode, as in FIGS. 1 and 2, or may be operated in a reflective mode, as in FIGS. 3 and 4. In FIG. 3, the cell is similar to that of FIGS. 1, 2, and 4, but the electrode 14 is made relatively thicker, having an inner surface 45 of chromium plate or of other smooth metallic material polished so that substantially all light from source 30 is reflected, traveling twice through medium 12 before reaching the observer's eye at 34. In addition, the cell of FIG. 3 is equipped externally with a circular polarizer 41. Again, as in FIGS. 1 and 2, the liquid crystal medium 12 is homeotropic in the absence of an electric field across it, behaving as an isotropic material for light propagating perpendicular to the display. Light entering the medium 12 of FIG. 3 is, for example, circularly polarized in a clock-wise sense and undergoes no net phase retardation in propagating through medium 12. When reflected off of mirror surface 45, the light becomes circularly polarized in the opposite sense and is substantially totally absorbed by circular polarizer 41 upon re-entering it. Hence, the total area of the display appears dark to the observer's eye at location 34, for example, when no electric field appears across medium 12.

When a predetermined electric field is placed across the liquid crystal medium 12, the display of FIG. 6 is again produced, because the effective birefringence of the liquid crystal medium 12 becomes large. Such results in a change of the ellipticity of light traversing the medium; hence, the display appearance changes from dark to light wherever the electric field across the medium is sufficient.

The cell in the reflection mode display of FIG. 4 is like the cells of FIGS. 1 and 2 in that light can pass entirely through the cell. The circular polarizer 41 of FIG. 3 is again used, but the interior reflecting surface 45 is placed outside of the cell of FIG. 4 in the form of mirror 43. The operation of the device is otherwise the same as the operation of the reflective mode device of FIG. 3. If desired, a light diffusing screen 42, such as may be constructed of opal glass, may be interposed between plate 11 and mirror 43 so as to broaden the angular viewing range $\phi$ of the device.

As has been observed in the foregoing, the novel display of the present invention is particularly concerned with the beneficial use of certain types of liquid crystal materials that exhibit electrically controllable optical birefringence properties, rather than simply with conventional turbulence or dynamic scattering characteristics. Examples of such electrically controllable birefringent materials remain to be discussed herein.

Figures 7, 8, 9:
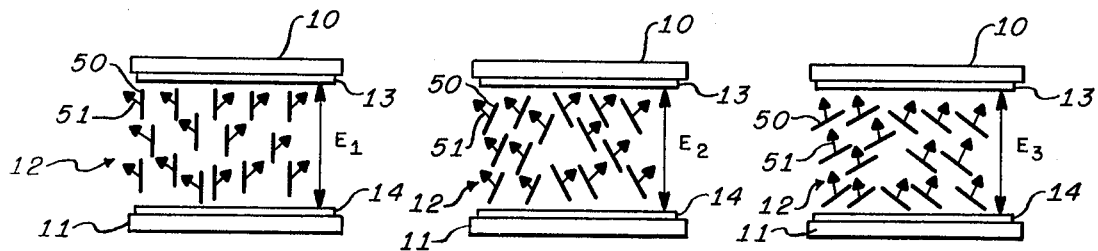
FIGS. 7 to 9 are symbolic views useful in explaining operation of the invention.

Materials of the electrically variable birefringent type have properties that may, in a schematic way, be represented as in the three views of FIGS. 7 to 9 according to the electric field's action upon the molecular orientation within the film. A side view like FIG. 1 of the optically active cell is illustrated and the thickness of layer 12 is again grossly exaggerated. The small bars, such as bar 50, indicate the local ordering directions of molecules, while the arrows, such as arrow 51, indicate the directions of molecular polarization, each polarization vector representing a vector summation of the permanent dipole moment and the induced polarization of the molecule. The ordering when $E_1 = 0$ produces an equilibrium molecular pattern, imposed by electrostatic attraction or wall forces (originating with the walls of electrodes 13 and 14) and by intermolecular forces. The perpendicular alignment is promoted by cleaning the electrode walls with a sulfuric acid-bichromate solution, by coating the walls with a surfactant, and by avoiding rubbing the wall surfaces during the cleaning process. The homeotropic alignment tends to suppress the emergence of dynamic scattering in the layer for unidirectional voltages in the range from zero to about 20 volts, and for alternating voltages from zero to about 14 r.m.s. As above noted, films of 0.25 mils or less thickness also aid in increasing the field of view of the display.

If the electric field $E_1$ of FIG. 7 is zero or rather weak, spontaneous ordering prevails and the birefringence of medium 12 is substantially zero for light propagating substantially normal to medium 12 (along the optical axis of the medium). Due to the negative anisotropy of medium 12, the angle between the axis and the molecular polarization is >45° and <90°.

The applied electric field exerts a dielectric torque on the molecular polarization, tending to rotate it into parallelism with the field. When the field $E_2$ becomes sufficiently high, as in FIG. 8, it may partially overcome the elastic restoring forces of the spontaneous pattern present when the field $E_1$ is weak or zero; then, the molecules rotate collectively into the new configuration of FIG. 8. A further increase in electric field strength, as represented by $E_3$ in FIG. 9, produces further rotation, with a rotation near 90° being possible. When the field $E_3$ is dropped to zero, the molecules relax, again taking up the relative positions of FIG. 7.

The molecules of liquid crystal materials suitable for the purpose are not, in general, cylindrically symmetric about their long axes and there will therefore be some three-dimensional randomness in the orientation of the short molecular axes in the original zero-field case, as represented only in two dimensions in FIG. 7. Thus, when re-ordering is commanded by the imposition of a finite electric field, the long axes of the molecules will take up locations substantially within a cone having an axis centered on the electric field direction. This feature causes the optical-axis orientation of individual clusters of molecules to change from one region to the next as seen in FIG. 9, for example, although each molecular cluster has the same birefringence.

The electric field re-ordered nematic material of FIG. 9 no longer appears entirely isotropic to normally incident light. The optical indicatrix of the medium has been distorted significantly and the medium has become birefringent along the axis of the electric field vector $E_3$, for example. Orthogonal linearly polarized light rays now travel with different speeds through the optically active medium 12.

Referring again to the light transmission forms of the invention shown in FIGS. 1 and 2, it is seen that these devices may be operated as light valves. In the transmissive mode, the cell is placed between the linear polarizer 32 and the linear analyzer 33; one useful procedure is to have the polarizers 32 and 33 in crossed relation, extinguishing light transmission when voltage $E_1$ is zero or below the characteristic threshold. If $E_1$ is raised above the threshold value to $E_3$, for instance, birefringence of a part or of all of the medium 12 is increased and optical transmission correspondingly increases over a portion or all of the area 22 of FIG. 6. It will be seen that other analog or digital displays may be operated in a similar manner.

For example, in the reflective analog displays of FIGS. 3 and 4, circular polarizer 41 is required on the optical input side of the cell. The circular polarizer 41 consists in the conventional manner of a linear polarizer and a quarter-wave plate; the linear polarizer produces linearly polarized light with orthogonal components $\alpha$ and $\beta$ for injection into the quarter-wave plate. On its first trip through the quarter-wave plate, the $\beta$ component may suffer a 90° phase retardation relative to the $\alpha$ component. When the electrically controlled birefringent medium 12 is not exposed to a field above its threshold value, no additional relative phase shift is produced. Mirror surface 45 also treats the phases of the α and β components equally. After reflection of the light components at surface 45, and after the second trip through the quarter-wave plate of circular polarizer 41, the β component experiences an additional 90° relative phase retardation. Therefore, the reflected light returns to the linear polarizer of device 41 and is substantially totally absorbed thereby. Above the electric field threshold value, as at the increased field strength $E_3$, the light returning through circular polarizer 41 is elliptically polarized over at least part of the field of view, and the light passes to the observer at 34.

One kind of multiple-component electrically controllable birefringence liquid crystal composition described herein includes as a common component a p-n-alkoxybenzylidine p-n-butylaniline, where the alkoxy radical may be an ethoxy or butoxy radical, and which may be identified by the general formula:

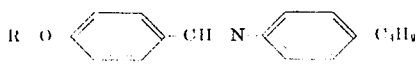

where R for the ethoxy material is $C_2H_5$ or, for a butoxy material, is $C_4H_9$ The constituent p-n-butoxybenzylidene p-n-butylaniline may be generated according to the following procedure. A mixture of commercially available p-n-butylaniline (1.5 grams, 0.1 mole) and of commercially available p-n-butoxybenzaldehyde (1.8 grams, 0.01 mole) was refluxed for two hours in ethanol. A reaction product resulted which, after filtration and recrystallization, provided 2.3 grams (a 75 per cent yield) of p-n-butoxybenzylidene p-n-butylaniline. This material demonstrated a melting point of +24° Centigrade with a smectic phase from +24° to +45° Centigrade and a nematic phase from +45° to +76° Centigrade. The infrared spectrum in $CCl_4$ showed the presence of no H—N, no H—CO, and no HC=O bands.

A second component of the one kind of multiple-component electro-optically active crystal composition is p-toluylidene p-n-butylaniline; this novel material was first described and claimed in the U.S. Pat. application Ser. No. 128,666 to M. J. Rafuse entitled: "Liquid Crystal Composition and Devices", filed Mar. 29, 1971, issued July 11, 1972 as U.S. Pat. No. 3,675,987, and assigned to the Sperry Rand Corporation. It may be identified by the formula:

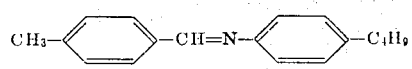

As described in the patent application Ser. No. 128,666, the novel compound p-toluylidene p-n-butylaniline may be generated by the following method. Commercially available p-tolualdehyde d(24.03 grams, 0.2 mole) and commercially available p-n-butylaniline (29.85 grams, 0.2 mole) were refluxed for 2 hours in 25 ml of absolute ethanol. The solvent was removed on a rotary evaporator and the residue was distilled three times under reduced pressure to yield 34.59 grams of a constant boiling fraction (b.p. +139° to +141° Centigrade at 0.06 mm of mercury) of p-toluylidene p-n-butylaniline (a 69 per cent yield). The refractive index of the pale yellow liquid was 1.6085 at +24° Centigrade. The infrared spectrum in $CCl_4$ showed the presence of no N—H, no H—CO, and no HC=O bands.

A wide range of relative precentages of the constituent materials p-n-butoxybenzylidene p-n-butylaniline and p-toluylidene p-n-butylaniline has been found useful, and mixtures in this range of the two-component composition may be prepared generally in the manner used for preparing a mixture of 70 per cent by weight of p-n-butoxybenzylidene p-n-butylaniline and 30 per cent by weight of p-toluylidene p-n-butylaniline. The proper proportions of the two constituents are melted together to form the isotropic phase of the mixture and then are cooled with continued stirring. The particular 70–30 per cent mixture exists in the nematic phase from +14° to +56° Centigrade and in the smectic phase from −35° to +14° Centigrade.

The useful range of relative weight percentages discovered for the mixture of p-n-butoxybenzylidene p-n-butylaniline with p-toluylidene p-n-butylaniline is shown in FIG. 10, with the circles representing experimentally derived points. The line 100, representing the boundary between isotropic and nematic liquid states, is seen to slope significantly from nearly +60° Centigrade to below +20° Centigrade. The line 101, representing the boundary between nematic and smectic states, falls from about +15° Centigrade to about −35° Centigrade with a similar slope. Dotted lines coupled to the boundary lines 100 and 101 represent reasonable extrapolation of the experimentally determined curves. As is seen from FIG. 10, the novel mixture of materials presents a wide range of choices of actual compositions, all of which have useful nematic characteristics at or below the usual ambient temperature.

The p-toluylidene p-n-butylaniline has the favorable action of greatly reducing the operating temperature of the composition in which it is employed. The temperature depressant material has the general geometric symmetry of the kind which often characterizes molecules having liquid crystal characteristics. Howver, it has no dipole characteristics at right angles to the long axis of the molecule. Therefore, its intermolecular interactions are too weak to confer liquid crystal properties upon it. Because of its long, rod-like shape, the p-toluylidene p-n-butylaniline molecule will fit compatibly between other molecules actually having good liquid crystal properties, weakening such intermolecular attraction and consequently lowering the operating temperature range of the multi-component composition.

Relatively small additive proportions of easily ionizable materials may be added to the foregoing binary material, such as substantially one per cent by weight of an ionizer such as p-n-ethoxyphenol or p-n-butoxyphenol. The effect of the ionizer material is noted, for example, when the material is used in turbulence displays by a significant increase in the turbulence effect and in the life of the display. The effect of the ionizer is particularly felt, in the case where the medium is used as a controllable birefringence medium, in beneficially decreasing the realignment threshold.

A second novel type of composition of optically active materials useful in the present invention includes mixtures of pentyl p-anisylidene p-aminophenyl carbonate and an alkoxybenzylidene material such as p-ethoxybenzylidene p-n-butylaniline, which mixtures have nematic phases from below −20° to +70° Centigrade.

The p-ethoxybenzylidene p-n-butylaniline, which may be represented by the formula:

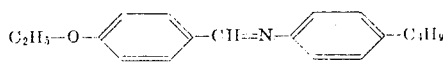

may be made as follows. Commercially available p-ethoxybenzaldehyde (7.5 grams, 0.05 mole) and p-n-butylaniline (7.5 grams, 0.05 mole) were refluxed in 20 ml of dry ethanol for 3 hours. The material was then cooled, filtered, and recrystallized three times from ethanol to yield 8.12 grams of the white material p-ethoxybenzylidene p-n-butylaniline with a melting point (nematic) from +32° to +77° Centigrade. This was a 58 per cent yield. The infrared spectrum in $CCl_4$ showed the presence of no N—H and no C=O bands.

The making of pentyl p-anisylidene p-aminophenyl carbonate, which may be identified by the formula:

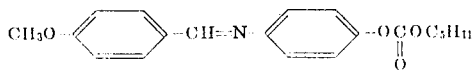

is a more complex procedure involving first making as an intermediate product the compound p-anisylidene p-aminophenol, which may be recognized by the formula:

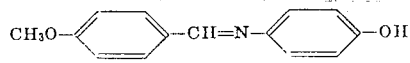

The compound p-anisylidene p-aminophenol may be made according to the following steps. Commercially available p-anisylidene (6.8 grams, 0.05 mole) and p-aminophenol (5.5 grams, 0.05 mole) were refluxed in 25 ml of dry ethanol for 2 hours. Cooling, filtering, and recrystallizing from ethanol gave 9.64 grams, which was an 85 per cent yield, of p-anisylidene p-aminophenol. The material was off-white in color with a melting point lying between +189° and +190° Centigrade. The infrared spectrum in mineral oil showed a broad response to the O—H vibration at 3200 to 2500 $cm^{-1}$.

For completing the second novel mixture of materials, p-anisylidene p-aminophenol (4.6 grams, 0.02 mole) was put in 20 ml of dry pyridine under nitrogen and 4.2 grams of triethylamine was added. To the mixture was added, drop by drop. 6.6 grams (0.02 mole) of amyl chloroformate dissolved in 10 ml of benzene. After this event, the reaction mixture was stirred for 20 hours, then flooded with water and extracted three times with 100 ml of benzene. The benzene layer was washed with water, dried, and evaporated to yield an oil-like material that solidified at +3° Centigrade. Recrystallization from ethanol, from hexane, and then again from ethanol gave 3.54 grams (a 52 per cent yield) of white pentyl p-anisylidene p-aminophenyl carbonate with a melting point (nematic) lying between +46° and +80° Centigrade. The infrared analysis in $CCl_4$ showed no O—H or N—H or OC—H bands. The presence of the C=O band was indicated at 1760 $cm^{-1}$.

A wide range of relative percentages of the constituent materials p-ethoxybenzylidene p-n-butylaniline and pentyl p-anisylidene p-aminophenyl carbonate has been found to be useful, and mixtures in this range of the two-component composition may be prepared generally in the same manner as is used in preparing a typical mixture of 25 per cent pentyl p-anisylidene p-aminophenyl carbonate and 75 per cent p-ethoxybenzylidene p-n-butylaniline by weight. The proper proportions of the two constituents are melted together to form the isotropic phase of the mixture and then are cooled while stirring.

For example, a mixture of 25 per cent by weight of pentyl p-anisylidene p-aminophenyl carbonate and 75 per cent by weight p-ethoxybenzylidene p-n-butylaniline was prepared by heating the two materials together to above the isotropic transition temperature and the melt was mixed by agitation while cooling to the nematic phase. This mixture exhibited a nematic liquid phase from below −20° to +77° Centigrade.

Figure 11:
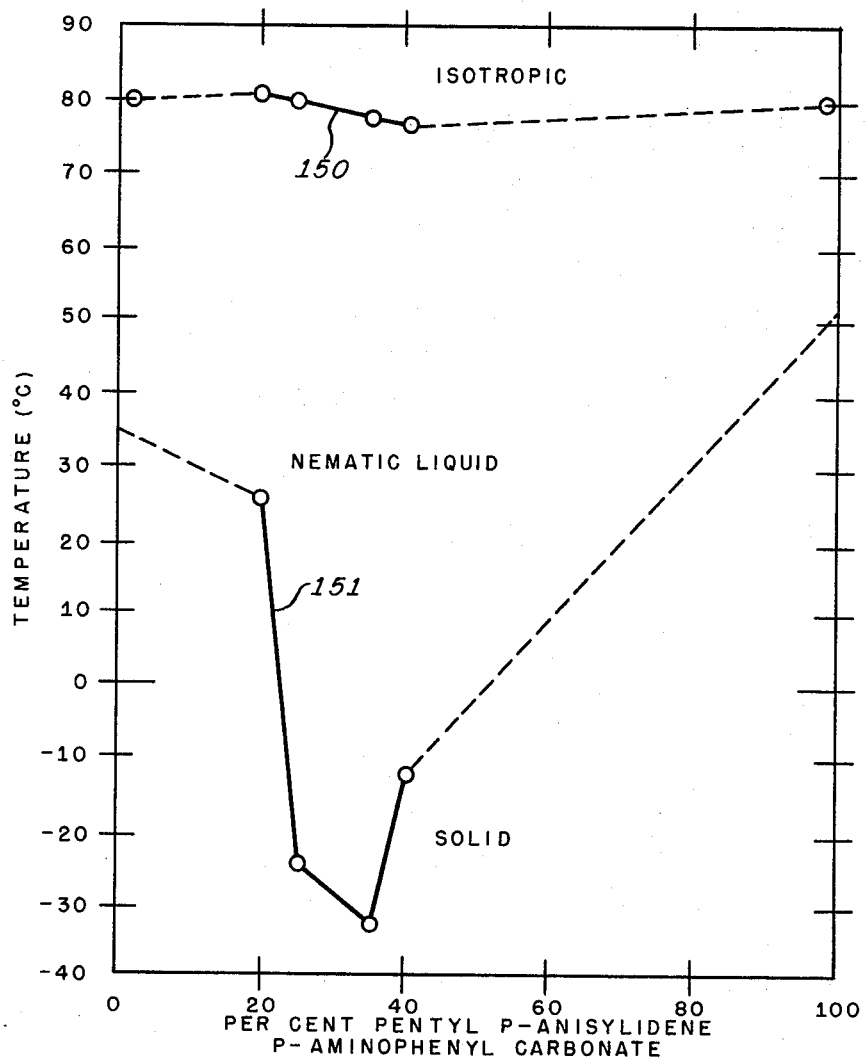

The useful range of relative weight percentage discovered for mixtures of p-ethoxybenzylidene p-n-butylaniline and pentyl p-anisylidene p-aminophenyl carbonate is illustrated in FIG. 11, with the circles representing experimentally derived points. The line 150, representing the boundary between isotropic and nematic liquid phases, is seen to extend at about +80° Centigrade, but with a slight slope. The line 151, representing the boundary between the nematic liquid and the solid state falls rapidly from about +27° Centigrade to −25° Centigrade then, in a short interval, falls below −30° Centigrade before climbing again to higher temperatures. The dotted lines illustrate reasonable extrapolations of the experimentally determined curves.

As is clear from observation of FIG. 11, the second novel mixture of materials offers a wide range of choices of actual compositions all of which have valuable nematic liquid crystal characteristics at or below usual ambient temperatures. Whether the material is used in a birefringence display or in a turbulence display small amounts of ionizer materials may readily be added, such as p-n-ethoxyphenol or p-n-butoxyphenol.

Figure 12:
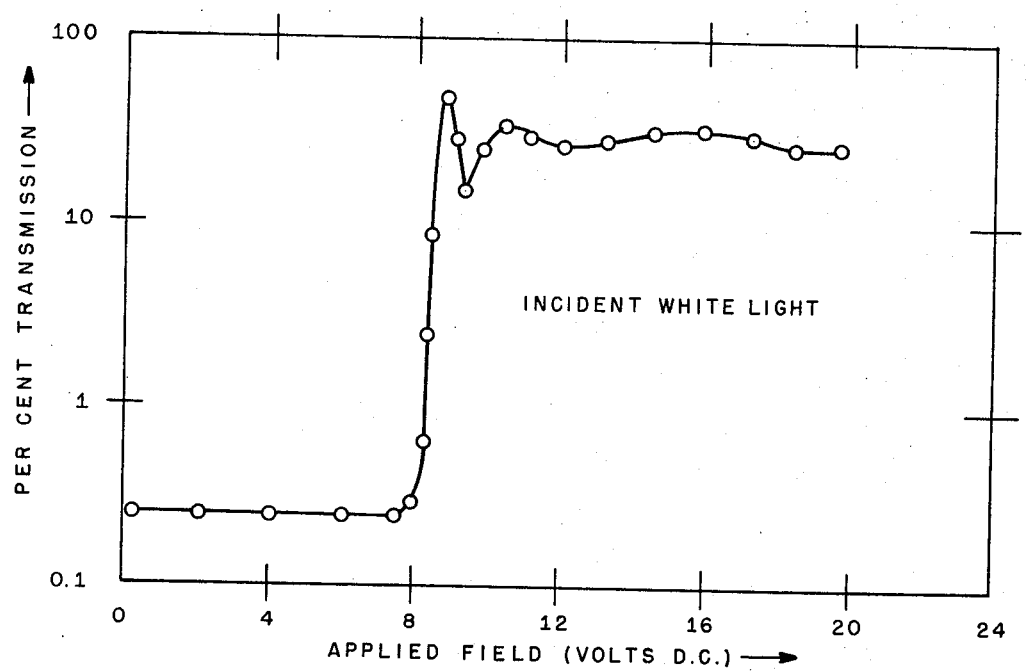

The properties of the two novel multi-component, electrically controllable birefringence compositions of materials are generally similar and may be illustrated for the sake of brevity by presenting information on the properties of the binary composition having 25 per cent by weight of pentyl p-anisylidene p-aminophenyl carbonate and 75 per cent by weight of p-ethoxybenzylidene p-n-butylaniline when employed in a display cell such as shown in FIG. 1, for example. The electro-optical transfer characteristic of FIG. 12 is the measured characteristic for white light with a constant-direction, steady-state electric field across a 0.5 mil layer of the medium 12 at room temperature. The collimated white light was normally incident with polarizers 32 and 33 crossed. It is seen that the transparency of the light valve jumps abruptly from a normalized value of 1 per cent at 8.2 volts to 55 per cent at 8.8 volts. If the medium 12 is exposed to an alternating electric field, the transition occurs at a lower r.m.s. voltage. For example, the percentage optical transmission in the selected example jumps abruptly from a normalized value of 1 per cent at 5.8 volts r.m.s. to a normalized value of 80 per cent at 6.5 volts r.m.s.

The two principal multi-component electrically controllable birefringence compositions may also be employed in dynamic scattering displays of the analog and digital types since, under certain predetermined conditions, the materials may also present electric field controllable turbulence effects. Dynamic scattering may be induced in both principal compositions at relatively low audio frequencies. However, the appearance of dynamic scattering effects is readily controllable, since the dynamic scattering in the two compositions is relatively weak and its threshold occurs at a unidirectional field of 16 to 20 volts, which is well above the threshold for induced dielectric re-alignment. Thus, it is possible to use the novel materials in one optically active mode or the other with complete absence of overlapping or interfering effects.

Figure 13:
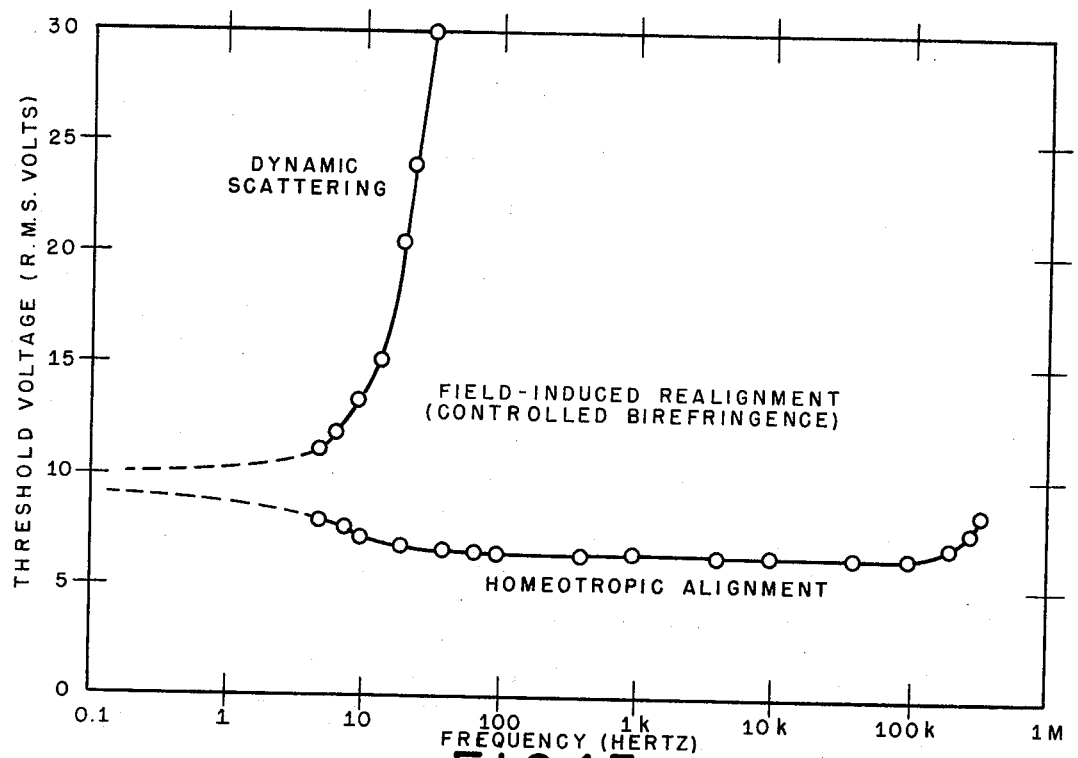

FIG. 13 illustrates the several regimes which appear in the selected example of 25 per cent pentyl p-anisylidene p-aminophenyl carbonate and 75 per cent p-ethoxybenzylidene p-n-butylaniline composition, for example. The graph of the figure illustrates the observed frequency-dependence of both thresholds, showing the distinct homeotropic alignment, dynamic scattering, and field induced birefringent realignment patterns and their mutual boundaries. In the figure, the realignment threshold is defined as the r.m.s. voltage at which the optical transmission first reaches 50 per cent of its maximum. Similarly, the dynamic scattering threshold is the r.m.s. voltage at which the time-averaged, on-axis polarized light transmission drops 50 per cent from its zero-voltage value. The birefringent response is seen to extend from zero to 350,000 cycles per second.

Figure 14:
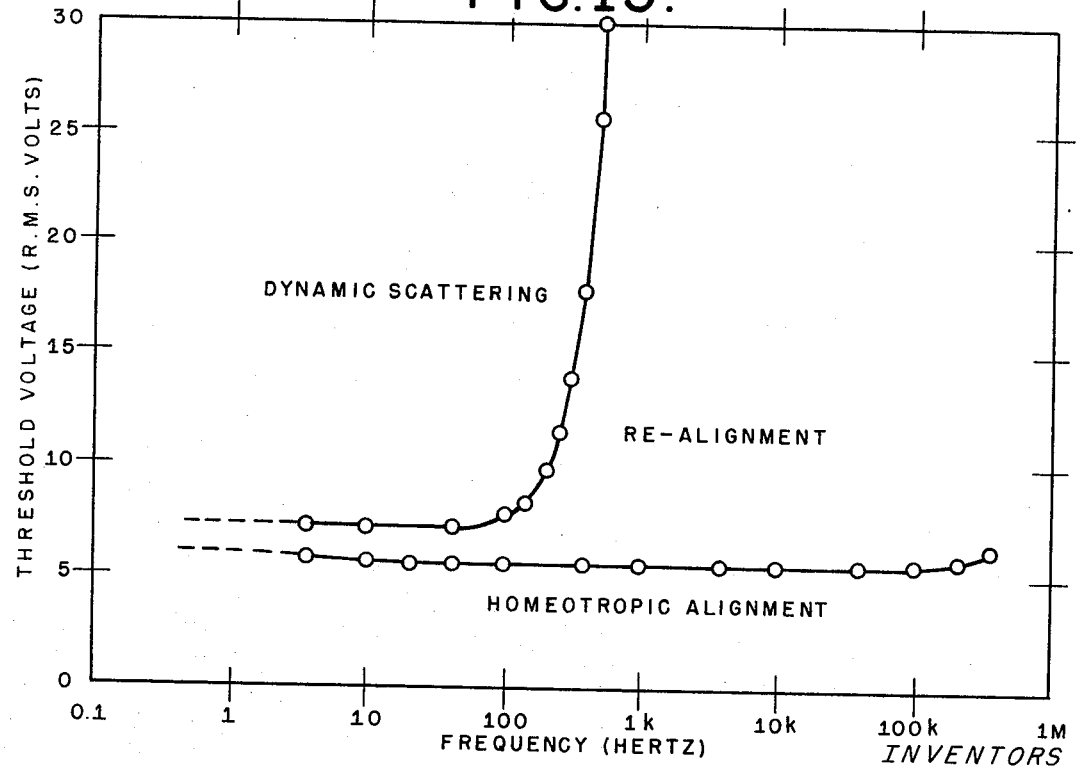

FIG. 14 was derived in the same way as FIG. 13, but it illustrates the situation in which an ionizable aromatic compound is added to the nematic liquid used in FIG. 13. The birefringence realignment voltage is favorably reduced. Where the novel composition is employed in the dynamic scattering mode, the maximum usable frequency for achieving dynamic scattering is increased. In deriving FIG. 14, 1 per cent by weight of p-n-butoxyphenol was added to the liquid medium used in FIG. 13, thus increasing the electrical conductivity of the liquid medium by a factor of 40. It is seen that the upper frequency for dynamic scattering is increased from 20 to 400 cycles per second. Also, the mid-frequency realignment threshold is favorably decreased from 6.6 volts r.m.s. to 5.5 volts r.m.s.

Figure 15:
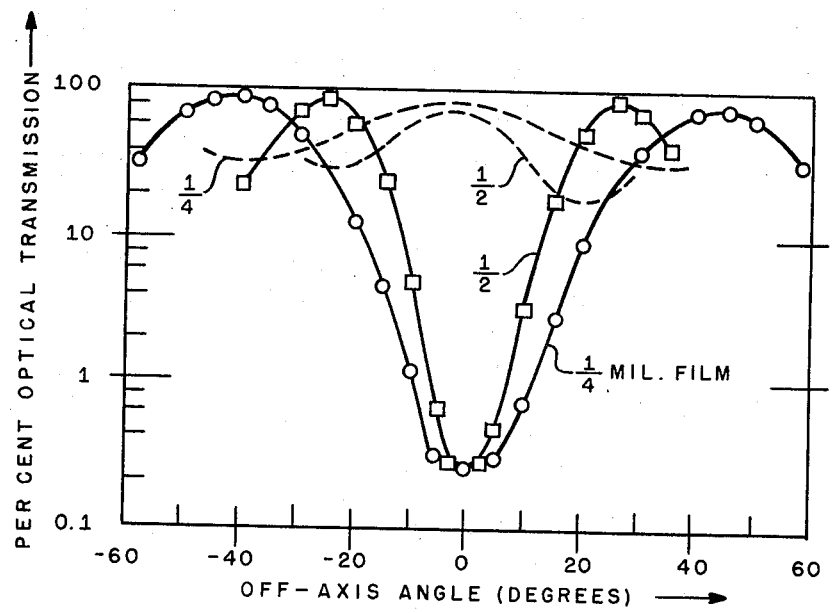

Angular width of view typical of the novel compositions is represented in FIG. 15, where optical transmission for two different thicknesses of the medium 12 of FIG. 1 is plotted as a function of the viewing angle $\phi$ with respect to the normal (for 0.25 and for 0.5 mil thick media). The angular field of view was obtained by plotting transmitted light intensity as a function of angle $\phi$ measurements being made in the zero field state and with a unidirectional field of 10 volts across the medium 12. It is seen that the optical contrast ratio between the two states may be greater than 100 to 1 within a 20 degree cone.

The versatile nature of the novel display and electrically controllable birefringence liquid crystal media of the present invention is clear from the foregoing. Readily adaptable to use in analog and digital types of liquid crystal panel displays, the novel features of the invention may also find use both in transmissive and in reflective types of such displays. Low driving direct or alternating voltages may be employed, voltages that are considerably lower than those required for dynamic scattering display devices. Since the novel effect is largely an electric field polarization effect, the currents used are primarily displacement currents and operating power is consequently lower than in dynamic scattering displays, where operation depends upon the transport of mobile charge carriers. Enhanced life times of operation may be demonstrated, such as on the order of several thousand hours, since electrolytic and other degrading effects due to conduction currents are absent. While the brightness of the controlled birefringence display is slightly lower than that of the dynamic scattering or turbulence display, contrast is greater and analog bar-graph displays, for example, show very sharp boundaries between light and dark portions of the display. Prior art liquid crystal materials have generally not been nematic at room temperature and have relatively high voltage thresholds as compared to the present materials. Also of material significance in permitting use of low cost driver circuits is the fact that prior art liquid crystal media are generally transparent in the zero voltage state and are opaque above the threshold voltage. The reverse is true of the novel liquid crystal media, making design of the effective driver circuits more convenient.

According to the invention, there are provided room temperature electrically controllable birefringence liquid crystal compositions of matter particularly suitable for use as nematic liquid crystal compositions in the novel optical display or in optical switches or other optical instruments. Binary and ternary compositions are disclosed useful in such instruments at temperatures between −30° and +70° Centigrade, whereas few prior art liquid crystal compositions display useful properties below +20° Centigrade.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. An electro-optically active composition of materials consisting of:
an alkoxybenzylidene p-n-butylaniline, and
pentyl p-anisylidene p-aminophenyl carbonate.

2. The composition described in claim 1 wherein the alkoxy radical is p-ethoxy.

3. The composition described in claim 1 wherein the alkoxy radical is p-butoxy.

4. The composition described in claim 1 consisting of:
an alkoxybenzylidene p-n-butylaniline as represented by the formula:

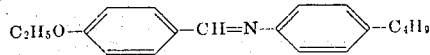

and pentyl p-anisylidene p-aminophenyl carbonate as represented by the formula:

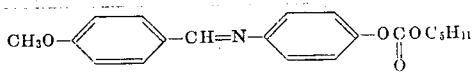

5. The composition described in claim 1 containing substantially 20 to 65 parts in a hundred parts by weight of the compound pentyl p-anisylidene p-aminophenyl carbonate, a substantial portion of the remainder being the compound p-ethoxybenzylidene p-n-butylaniline.

6. The composition described in claim 1 containing substantially 20 to 40 parts in a hundred parts by weight of the compound pentyl p-anisylidene p-aminophenyl carbonate, a substantial portion of the remainder being the compound p-ethoxybenzylidene p-n-butylaniline.

7. The composition described in claim 1 containing substantially 22 to 40 parts in a hundred parts by weight of the compound pentyl p-anisylidene p-aminophenyl carbonate, a substantial portion of the remainder being the compound p-ethoxybenzylidene p-n-butylaniline.

8. The composition described in claim 1 containing substantially 27.5 parts by weight of the compound pentyl p-anisylidene p-aminophenyl carbonate and substantially 72.5 parts by weight of the compound p-ethoxybenzylidene p-n-butylaniline.

9. The composition described in claim 2 to which is added substantially one per cent by weight of a p-n-alkoxyphenol.

10. An electro-optically active composition of materials consisting of:
an alkoxybenzylidene p-n-butylaniline, and
p-toluylidene p-n-butylaniline.

11. The composition described in claim 10 wherein the alkoxy radical is p-n-butoxy.

12. The composition described in claim 10 consisting of:
p-n-butoxybenzylidene p-n-butylaniline as represented by the formula:

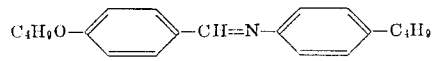

and
p-toluylidene p-n-butylaniline as represented by the formula:

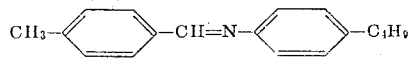

13. The composition described in claim 10 consisting of substantially 20 to 72 per cent by weight of the compound p-toluylidene p-n-butylaniline, a substantial portion of the remainder consisting of the compound p-n-butoxybenzylidene p-n-butylaniline.

14. The composition described in claim 10 consisting of substantially 36 to 82 per cent by weight of the compound p-toluylidene p-n-butylaniline, a substantial portion of the remainder consisting of the compound p-n-butoxybenzylidene p-n-butylaniline.

15. The composition described in claim 10 consisting of substantially 42 to 82 per cent by weight of the compound p-toluylidene p-n-butylaniline, a substantial portion of the remainder consisting of the compound p-n-butoxy benzylidene p-n-butylaniline.

16. The composition described in claim 10 to which is added substantially 1 per cent by weight of a p-n-alkoxyphenol.

17. An electro-optically active device comprising:
container means for supporting a layer of electro-optically active material, and
transparent electrode means constituting a portion of said container means for applying an electric field pattern across said active layer,
said layer consisting of:
an alkoxybenzylidene p-n-butylaniline, and
pentyl p-anisylidene p-aminophenyl carbonate.

18. Apparatus as described in claim 17 wherein said layer includes p-ethoxybenzylidene p-n-butylaniline.

19. Apparatus as described in claim 18 wherein said layer additionally includes a p-n-alkoxyphenol.

20. An electro-optically active device comprising:
container means for supporting a layer of electro-optically active material, and
transparent electrode means constituting a portion of said container means for applying an electric field pattern across said active layer,
said layer consisting of:
an alkoxybenzylidene p-n-butylaniline, and p-toluylidene p-n-butylaniline.

21. The apparatus described in claim 20 wherein said layer includes p-n-butoxybenzylidene p-n-butylaniline.

22. The apparatus described in claim 21 wherein said layer additionally includes a p-n-alkoxyphenol.

* * * * *